(12) United States Patent
Kim

(10) Patent No.: US 7,706,139 B2
(45) Date of Patent: Apr. 27, 2010

(54) PLASMA DISPLAY DEVICE AND ITS METHOD OF MANUFACTURE

(75) Inventor: Myoung-Kon Kim, Suwon-si (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 11/808,240

(22) Filed: Jun. 7, 2007

(65) Prior Publication Data

US 2008/0122739 A1 May 29, 2008

(30) Foreign Application Priority Data

Nov. 27, 2006 (KR) .................. 10-2006-0117846

(51) Int. Cl.
*H05K 5/00* (2006.01)
*H05K 7/00* (2006.01)

(52) U.S. Cl. .................. 361/679.21; 361/679.22; 361/679.26

(58) Field of Classification Search ............. 361/681, 361/679.21, 679.22, 679.26
See application file for complete search history.

(56) References Cited

U.S. PATENT DOCUMENTS

| | | | | |
|---|---|---|---|---|
| 4,577,402 A * | 3/1986 | Swanstrom | ............ | 29/840 |
| 4,653,244 A * | 3/1987 | Farrell | ............ | 52/745.21 |
| 4,713,714 A * | 12/1987 | Gatti et al. | ............ | 360/137 |
| 4,760,495 A * | 7/1988 | Till | ............ | 361/804 |
| 5,065,283 A * | 11/1991 | Adachi et al. | ............ | 361/775 |
| 5,761,031 A * | 6/1998 | Ajmani | ............ | 361/679.34 |
| 6,196,516 B1 * | 3/2001 | Lan | ............ | 248/634 |
| 6,262,887 B1 * | 7/2001 | Lee | ............ | 361/683 |
| 6,347,042 B1 * | 2/2002 | White | ............ | 361/784 |
| 6,377,445 B1 * | 4/2002 | Davis et al. | ............ | 361/683 |
| 6,424,538 B1 * | 7/2002 | Paquin | ............ | 361/752 |
| 6,493,233 B1 * | 12/2002 | De Lorenzo et al. | ............ | 361/752 |
| 6,542,372 B1 * | 4/2003 | Paquin et al. | ............ | 361/758 |
| 6,560,119 B1 * | 5/2003 | Katsuyama et al. | ............ | 361/752 |
| 6,695,629 B1 * | 2/2004 | Mayer | ............ | 439/92 |
| 6,741,477 B2 * | 5/2004 | Sivertsen | ............ | 361/752 |
| 6,762,932 B2 * | 7/2004 | Regimbal et al. | ............ | 361/683 |
| 6,769,852 B2 * | 8/2004 | Nilsen et al. | ............ | 411/533 |
| 6,781,055 B2 * | 8/2004 | Chen | ............ | 174/535 |
| 7,016,189 B2 * | 3/2006 | Lin | ............ | 361/679.34 |
| 7,028,389 B2 * | 4/2006 | Chang | ............ | 29/739 |
| 7,118,303 B2 * | 10/2006 | Doubler et al. | ............ | 403/362 |
| 7,206,039 B2 * | 4/2007 | Kawamoto et al. | ............ | 349/59 |
| 7,215,549 B2 * | 5/2007 | Kim | ............ | 361/704 |
| 7,225,529 B2 * | 6/2007 | Wang | ............ | 29/739 |
| 7,259,958 B2 * | 8/2007 | Bang et al. | ............ | 361/681 |

(Continued)

FOREIGN PATENT DOCUMENTS

JP  2002-115442  4/2002

(Continued)

*Primary Examiner*—Jayprakash N Gandhi
*Assistant Examiner*—Anthony M Haughton
(74) *Attorney, Agent, or Firm*—Robert E. Bushnell, Esq.

(57) ABSTRACT

A plasma display device and its method of manufacture includes a chassis base supporting a Plasma Display Panel (PDP) and having at least one assembly hole, and at least one standoff, each standoff having a first end inserted into a respective assembly hole of the chassis base and a second end coupled to the chassis base. The second end of each standoff is pressed into the chassis base.

21 Claims, 8 Drawing Sheets

U.S. PATENT DOCUMENTS

| | | | | |
|---|---|---|---|---|
| 2002/0054475 | A1* | 5/2002 | Boss et al. | 361/685 |
| 2005/0047100 | A1* | 3/2005 | Kim | 361/758 |
| 2005/0079748 | A1* | 4/2005 | Kim | 439/92 |
| 2006/0192730 | A1* | 8/2006 | Kim et al. | 345/60 |

FOREIGN PATENT DOCUMENTS

| | | |
|---|---|---|
| KR | 2002-0091314 | 12/2002 |
| KR | 10-2005-0025245 | 3/2005 |
| KR | 10-0635747 | 10/2006 |

* cited by examiner

PLASMA DISPLAY DEVICE AND ITS METHOD OF MANUFACTURE

CLAIM OF PRIORITY

This application makes reference to, incorporates the same herein, and claims all benefits accruing under 35 U.S.C.§119 from an application for PLASMA DISPLAY DEVICE earlier filed in the Korean Intellectual Property Office on the 27$^{th}$ day of Nov. 2006 and there duly assigned Serial No. 10-2006-0117846.

BACKGROUND OF THE INVENTION

1. Field of the Invention

The present invention relates to a plasma display device and its method of manufacture. More particularly, the present invention relates to a plasma display device having an improved coupling structure between a chassis base and a standoff and its method of manufacture.

2. Description of Related Art

Generally, a plasma display device is a display device that can display an image on a Plasma Display Panel (PDP) using a plasma generated by a gas discharge.

A plasma display device includes a PDP for displaying an image, a chassis base for supporting the PDP, and a circuit board assembly facing the PDP and connected to display and address electrodes disposed in the PDP through a flexible printed circuit and a connector.

The plasma display device further includes a case defining an outer appearance of the plasma display device by surrounding the PDP, the chassis base and the circuit board assembly.

The PDP includes two glass substrates sealed together and discharge cells formed between the glass substrates. The PDP is a display panel for displaying an image by exciting phosphors using vacuum ultraviolet rays generated by the gas discharge occurring in the discharge cells. The PDP has excellent display capacity, luminance, contrast, view angle and the like while being large and slim.

The chassis base is formed of a metal having relatively high mechanical strength to support the PDP. The chassis base is attached to the PDP by, for example, double-sided tape.

The chassis base serves to maintain the toughness of the display panel and support the circuit board assembly. Furthermore, the chassis base functions as a heat sink for dissipating heat generated by the PDP and as a ground for grounding Electro-Magnetic Interference (EMI). In order to couple the circuit board assembly to the chassis base, a variety of standoffs (e.g., bosses) are arranged on a rear surface of the chassis base.

Recently, it has become necessary to improve the chassis base in order to reduce a weight of the PDP and to simplify a structure of the PDP. In response to this requirement, a thickness of the chassis base has been gradually reduced: 2.5 mm→2.0 mm→1.5 mm→1.0 mm→0.8 mm→0.6 mm. Therefore, there is a need to develop a method of effectively attaching the standoffs to the chassis base.

SUMMARY OF THE INVENTION

The present invention provides a plasma display device and its method of manufacture that can respond to a thickness reduction of the chassis base by improving a coupling relationship between a chassis base and at least one standoff and that can enhance a coupling force between the chassis base and the at least one standoff.

In one exemplary embodiment of the present invention, a plasma display device includes; a chassis base to support a Plasma Display Panel (PDP) and including at least one assembly hole; and at least one standoff, each standoff having a first end arranged in a respective assembly hole of the chassis base and a second end coupled to the chassis base, the second end of each standoff being pressed into the chassis base.

Each standoff preferably includes: a cylindrical portion having an outer diameter insertable into a respective assembly hole; a first deforming portion extending from the cylindrical portion and inserted into the respective assembly hole, the first deforming portion being pressed into a first surface of the chassis base; and a second deforming portion extending from the first deforming portion, the second deforming portion being pressed into a second surface opposite to the first surface of the chassis base with the respective assembly hole interposed between the second deforming portion and the second surface.

The first deforming portion preferably has a greater outer diameter than an outer diameter of the cylindrical portion. The first deforming portion preferably has a height greater than a thickness of the chassis base.

The second deforming portion preferably has a greater outer diameter than a diameter of the respective assembly hole. The second deforming portion preferably has a thickness less than that of the chassis base.

A surface of the first deforming portion is preferably arranged on a common plane with the first surface of the chassis base upon the first deforming portion being pressed into the first surface of the chassis base.

A plane where a pressed surface of the first deforming portion contacts the chassis base is preferably inclined with respect to the first surface of the chassis base upon the first deforming portion being pressed into the first surface of the chassis base.

A surface of the second deforming portion is preferably arranged on a common plane with the second surface of the chassis base upon the second deforming portion being pressed into the second surface of the chassis base.

The cylindrical portion preferably includes a coupling hole to receive a coupling member. The coupling hole preferably includes a screw thread arranged on an inner wall of the cylindrical portion.

In another exemplary embodiment of the present invention, a method of manufacturing a plasma display device is provided, the method including: fabricating at least one assembly hole in a chassis base to support a Plasma Display Panel (PDP); and pressing at least one standoff into the chassis base, each standoff having a first end arranged in a respective assembly hole of the chassis base and a second end coupled to the chassis base, the second end of each standoff being pressed into the chassis base.

Each standoff is preferably fabricated to include a cylindrical portion having an outer diameter, a first deforming portion extending from the cylindrical portion, and a second deforming portion extending from the first deforming portion: and the method further includes: inserting the cylindrical portion having an outer diameter into a respective assembly hole; inserting the first deforming portion extending from the cylindrical portion into the respective assembly hole and pressing the first deforming portion into a first surface of the chassis base; and pressing the second deforming portion extending from the first deforming portion into a second surface opposite to the first surface of the chassis base with the respective assembly hole interposed between the second deforming portion and the second surface.

The first deforming portion is preferably fabricated to have a greater outer diameter than an outer diameter of the cylindrical portion. The first deforming portion is preferably fabricated to have a height greater than a thickness of the chassis base.

The second deforming portion is preferably fabricated to have a greater outer diameter than a diameter of the respective assembly hole. The second deforming portion is preferably fabricated to have a thickness less than that of the chassis base.

A surface of the first deforming portion is preferably arranged on a common plane with the first surface of the chassis base upon the first deforming portion being pressed into the first surface of the chassis base.

A plane where a pressed surface of the first deforming portion contacts the chassis base is preferably inclined with respect to the first surface of the chassis base upon the first deforming portion being pressed into the first surface of the chassis base.

A surface of the second deforming portion is preferably arranged on a common plane with the second surface of the chassis base upon the second deforming portion being pressed into the second surface of the chassis base.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully below with reference to the accompanying drawings, in which exemplary embodiments of the present invention are shown. The present invention may, however, be embodied in many different forms and should not be construed as being limited to the embodiments set forth herein; rather these embodiments are provided so that this disclosure will be thorough and complete, and will fully convey the concept of the present invention to those skilled in the art. Wherever possible, the same reference numbers have been used throughout the drawings to refer to the same or like parts.

Figure 1:
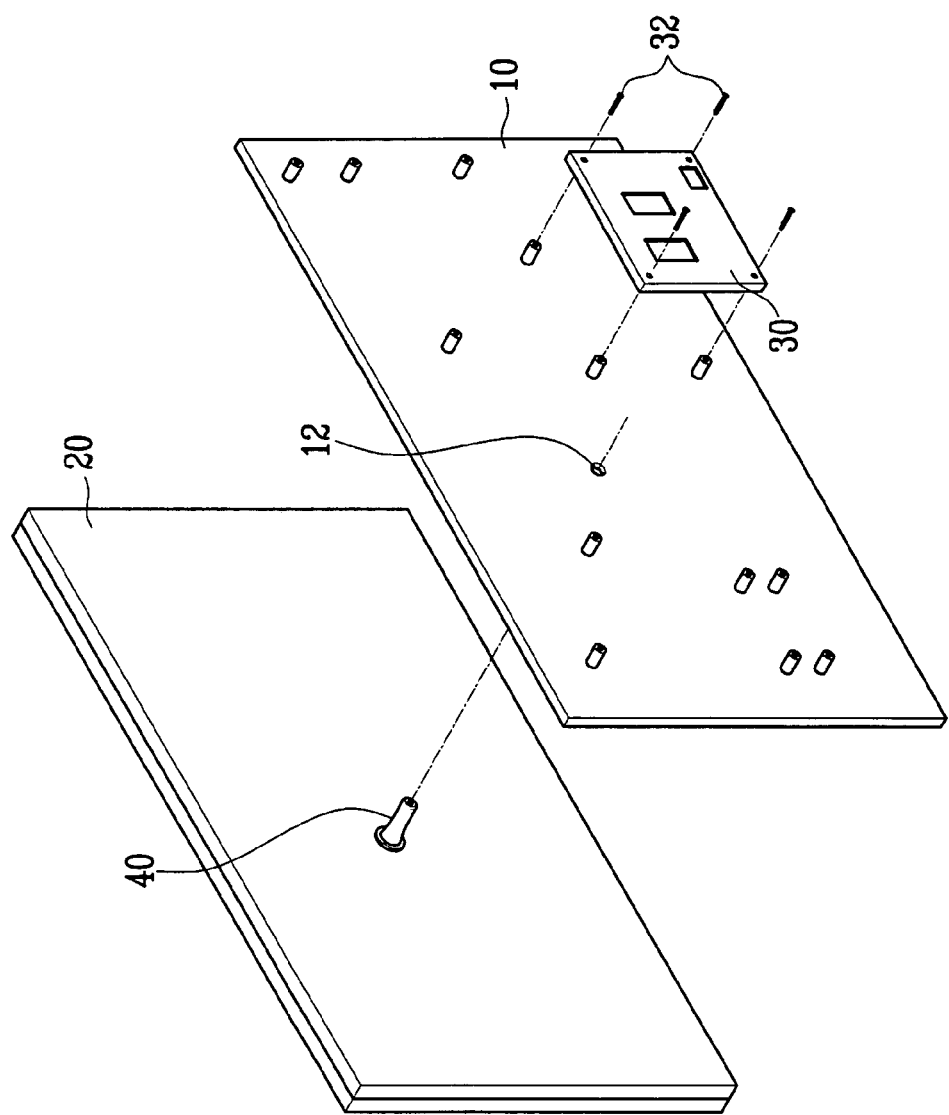
FIG. 1 is a schematic exploded perspective view of a plasma display device according to an embodiment of the present invention.

FIG. 1 is an exploded perspective view of a plasma display device according to an embodiment of the present invention.

Referring to FIG. 1, a plasma display device of an embodiment of the present invention includes a chassis base 10 having a first surface supporting a Plasma Display Panel (PDP) 20 and provided with a plurality of assembly holes 12, (although only one hole is shown for clarity), and at least one driving module 30 installed on a second surface of the chassis base, which is opposite to the first surface, and is provided with a circuit for driving the PDP 20.

A variety of standoffs 40, (although only one standoff is shown for clarity), for fixing printed circuit boards of the driving module 30 or other structures (e.g., a wall-mounting structure, a guide stand, or a package) are coupled to their respective assembly hole 12.

Figure 2:
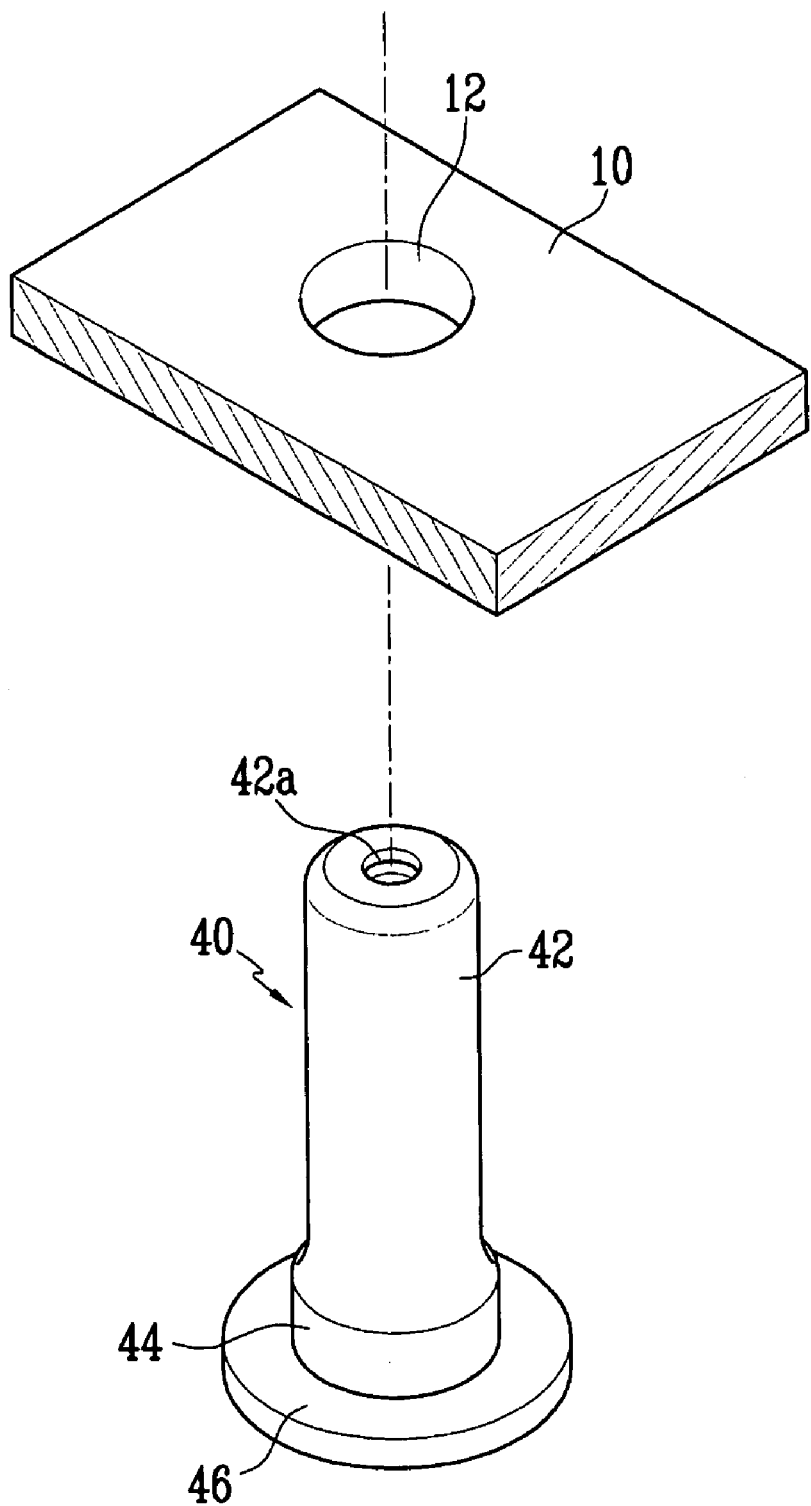
FIG. 2 is an exploded perspective view of a coupling structure between one standoff and a chassis base according to an embodiment of the present invention.
Figure 3:
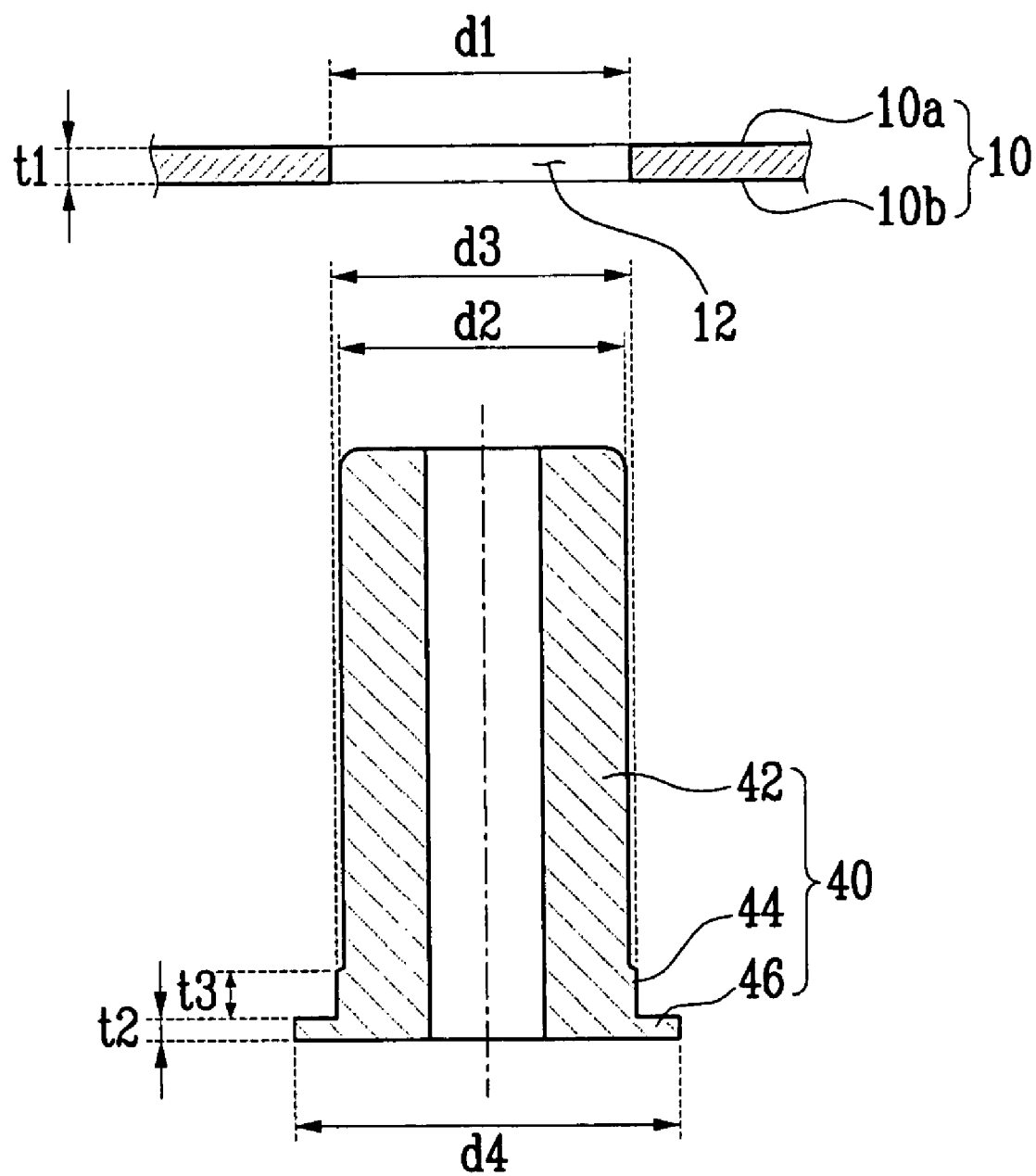
FIG. 3 is a sectional view of FIG. 2.

FIG. 2 is an exploded perspective view of a coupling structure between one standoff and the chassis base according to an embodiment of the present invention and FIG. 3 is a sectional view of FIG. 2.

Referring to FIGS. 2 and 3, the standoff 40 includes a cylindrical portion 42, a first deforming portion 44, and a second deforming portion 46. The standoff 40 has a first end inserted in the assembly hole 12 and a second end forcedly pressed in the chassis base 10 by an external force.

The cylindrical portion 42 has an outer diameter d2 less than a diameter d1 of the assembly hole 12. The cylindrical portion 42 is provided with a coupling hole 42a in which a coupling member such as a bolt 32 is coupled to fix the driving module 30 or other structures on the cylindrical portion 42. A screw thread (not shown) is formed on an inner circumference of the coupling hole 42a.

The first deforming portion 44 extends integrally from the cylindrical portion 42. The first deforming portion 44 contacts an inner circumference of the assembly hole 12 when the standoff 40 is inserted in the assembly hole 12. The first deforming portion 44 has an outer diameter d3 greater than the outer diameter d2 of the cylindrical portion 42 but less than the diameter d1 of the assembly hole 12. The first deforming portion 44 is forcedly pressed in a first surface 10a of the chassis base 10 according to an external force in a state where the first deforming portion 44 is inserted in the assembly hole 12.

The second deforming portion 46 is integrally formed with the first deforming portion 44, having an outer diameter d4 greater than the diameter d1 of the assembly hole 12. As the outer diameter d4 of the second deforming portion 46 is greater than the diameter d1 of the assembly hole 12, the second deforming portion 46 is not inserted into the assembly hole 12 but contacts a second surface 10b of the chassis base 10. The second deforming portion 46 is forcedly pressed in the second surface 10b of the chassis base 10 according to an external force in a state where it contacts the second surface 10b of the chassis base 10.

Figure 4:
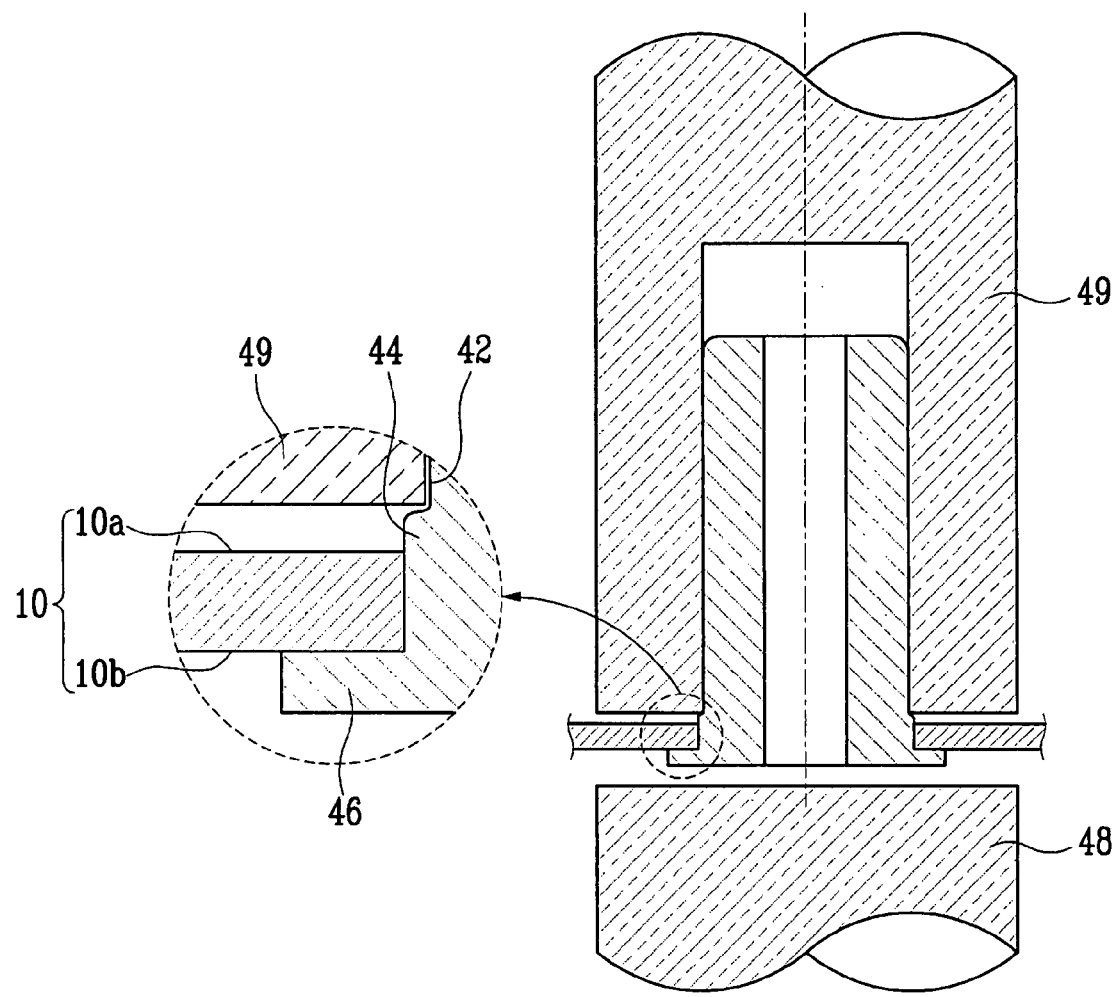
FIG. 4 is a sectional view of an example where a mold is used when a standoff is coupled to a chassis base according to an embodiment of the present invention.
Figure 5:
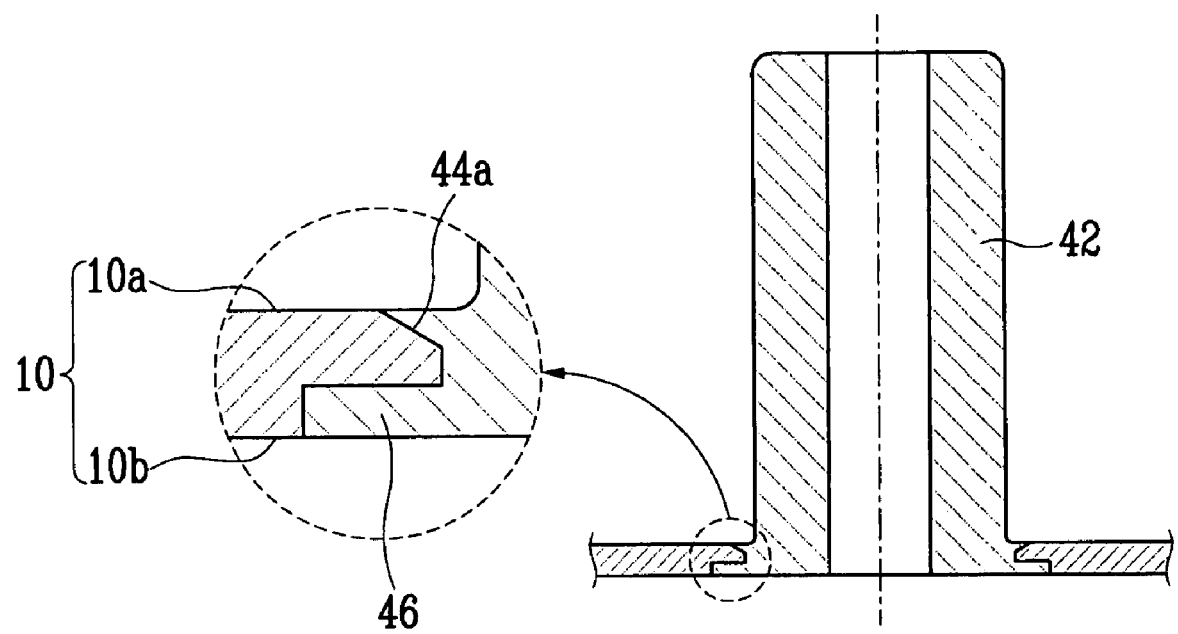
FIG. 5 is an exploded perspective view of a coupled state between the standoff and the chassis base according to an embodiment of the present invention.

FIG. 4 is a sectional view of an example where a mold is used when the standoff is coupled to the chassis base according to an embodiment of the present invention and FIG. 5 is an exploded perspective view of a coupled state between the standoff and the chassis base according to an embodiment of the present invention.

As shown in FIG. 4, the cylindrical portion 42 and the first deforming portion 44 of the standoff 40 are first inserted into the assembly hole 12 of the chassis base 10 so that the second deforming portion 46 surface-contacts the chassis base 10. Therefore, the standoff 40 is primarily coupled to the chassis base 10.

Then, as shown in FIG. 4, a mold having a punch 48 and a die 49 is used to press-deform the first deforming portion 44 inserted in the assembly hole 12 of the chassis base 10 and the second deforming portion 46 contacting the second surface 10b of the chassis base 10.

During this process, the first deforming portion 44 is deformed such that the outer diameter of the first deforming portion 44 becomes substantially identical to the outer diameter d2 of the cylindrical portion 42. At this point, as shown in FIG. 5, the pressed portion of the first deforming portion 44 is pressed in the first surface 10a of the chassis base 10 adjacent to an upper portion of the assembly hole 12.

The pressed portion of the second deforming portion 46 is pressed in the second surface 10b of the chassis base 10 adjacent to a lower portion of the assembly hole 12.

As described above, the first sand second deforming portions 44 and 46 are respectively pressed in the first and second surfaces 10a and 10b at the upper and lower portions of the assembly holes 12, thereby enhancing the coupling force to the chassis base 10. In the specification and the deforming portion refers to, unless otherwise specified, a portion of the standoff which is, or is subject to be, or is currently deformed Furthermore, as shown in FIG. 4, when the first and second deforming portions 44 and 46 are pressed in the chassis base 10, the surfaces of the standoff 40 are disposed on a common planes with the surfaces of the chassis base 10 and thus a contact resistance caused by a protruding portion of the standoff 40 can be prevented during an assembling process of the chassis base 10 with the PDP 20.

Generally, when the standoff used in the PDP 20 is coupled to the chassis base, the chassis base is required to have a thickness equal to or greater than a preset thickness. Specifically, the chassis base is required to have a thickness of 0.8 mm or more.

That is, the thickness of the chassis base must be greater than a predetermined level so as to process a groove for the standoff that will be coupled to the chassis base.

However, when the thickness of the chassis base is less than 0.8 mm as in the present embodiment, it is difficult to process the groove for the standoff on the chassis member and a drawing force of the chassis base may be significantly deteriorated. In addition, since the number of assembling processes increases due to the groove process for the standoff, productivity may be deteriorated.

However, according to the present embodiment, even when the chassis base 10 is designed to have a thickness less than a predetermined level, there is no need to process the groove for the standoff and thus the deterioration of the drawing force can be prevented. Furthermore, since the groove forming process can be omitted, the productivity can be improved.

As described above, the present embodiment of the present invention relates to a coupling structure between the chassis base 10 for supporting the PDP and the standoff 40.

According to the embodiment of the present invention, the standoff 40 can be effectively coupled to the chassis base 10 with the enhanced coupling force and the low costs even as the thickness of the chassis base 10 is reduced and thus it becomes difficult to process a space for the standoff 40 on the chassis base.

That is, in the present embodiment, the first deforming portion 44 inserted in the assembly hole 12 of the chassis base 10 is designed in a different shape from the cylindrical shape 42. In more detail, the outer diameter d3 of the first deforming portion 44 is designed to be greater than the outer diameter d2 of the cylindrical portion 42, so the outer circumference of the standoff 40 is formed with two steps.

A height of the first deforming portion 44 is greater than a thickness of the chassis base 10. The outer diameter d3 of the first deforming portion 44, which is greater than the outer diameter d2 of the cylindrical portion 42, may vary depending on a degree to which the first deforming portion 44 is pressed in the first surface 10a of the chassis base 10.

For example, the outer diameter d1 of the first deforming portion 44 may be set at a degree where the first deforming portion 44 is disposed on an identical plane to the first surface 10a of the chassis base when the first deforming portion 44 is pressed in the first surface 10a.

In this state, the first deforming portion 44 is inserted in the assembly hole 12 of the chassis base 10 and the first deforming portion 44 is pressed in the first surface 10a of the chassis base 10 using the mold.

Then, by the pressing force applied by the punch 48 and the die 49 of the mold, the first deforming portion 44 of the standoff 40 is forcedly pressed in the chassis base 10 and an undercut is formed between the standoff 40 and the chassis base 10.

In addition, as the first deforming portion 44 is pressed in the chassis base 10, the portion where the first deforming portion 44 has been formed is deformed to have an outer diameter that is substantially the same as the outer diameter d2 of the cylindrical portion 42.

Referring to FIG. 5, the first deforming portion 44 has a surface lying on an identical plane to the first surface 10a of the chassis base 10 in a state where the first deforming portion 44 is pressed in the first surface 10a of the chassis base 10. In addition, in a state where the first deforming portion 44 is pressed in the first surface 10a of the chassis base 10, a contacting surface of the pressed surface of the first deforming portion 44 with the chassis base 10 is defined by an inclined surface 44a that is inclined at a predetermined angle.

In order to further enhance the coupling force of the standoff 40 to the chassis base 10, a shape of the second deforming portion 46 contacting the chassis base 10 is formed to be different from that of the first deforming portion 44.

That is, an outer d4 diameter of the second deforming portion 46 is designed to be greater than the outer diameter d3 of the first deforming portion 44. Also, the outer diameter D4 of the second deforming portion 46 is designed to be greater than the diameter d1 of the assembly hole 12 so that the second deforming portion 46 is not inserted in the assembly hole 12 but contacts the chassis base 10.

The second deforming portion 46 is thinner than the chassis base 10. Making the second deforming portion 46 thinner than the chassis base 10 means that the thickness of the second deforming portion 46 may vary depending on a degree to which the second deforming portion 46 is pressed in.

For example, the thickness of the second deforming portion 46 may be set to a degree where the second deforming portion 46 is disposed on an identical plane to the second surface 10b of the chassis base when the second deforming portion 46 is pressed in the second surface 10b.

In a state where the first deforming portion 44 is inserted in the assembly hole 12 of the chassis base 10 and the second deforming portion 46 contacts the second surface 10b of the chassis base 10, the first and second deforming portions 44 and 46 are respectively pressed in the first and second surfaces 10a and 10b of the chassis base 10 using the mold.

Then, by the pressing force applied by the punch 48 and the die 49 of the mold, the first deforming portion 44 of the standoff 40 is forcedly pressed in the chassis base 10 and an undercut is formed between the standoff 40 and the chassis base 10.

In addition, as the first deforming portion 44 is pressed in the chassis base 10, the portion where the first deforming portion 44 has been formed is deformed to have an outer diameter that is substantially the same as the outer diameter d2 of the cylindrical portion 42.

Furthermore, the second deforming portion 46 of the standoff 40 is forcedly pressed in the second surface 10b of the chassis base 10 and thus another undercut is formed between the standoff 40 and the chassis base 10.

Referring to FIG. 5, in a state where the second deforming portion 46 is pressed in the second surface 10b of the chassis base 10, a surface of the second deforming portion 46 is disposed on a common plane with the second surface 10b of the chassis base 10.

As described above, since there is no need to process grooves on the standoff 40 and the chassis base for the coupling the standoff 40 to the chassis base 10, it can be expected that the manufacturing cost can be reduced.

Furthermore, since the molding process (forging press) can be applied for processing the standoff 40, a chassis base that is thinner than a preset thickness can be applied.

Figure 6:
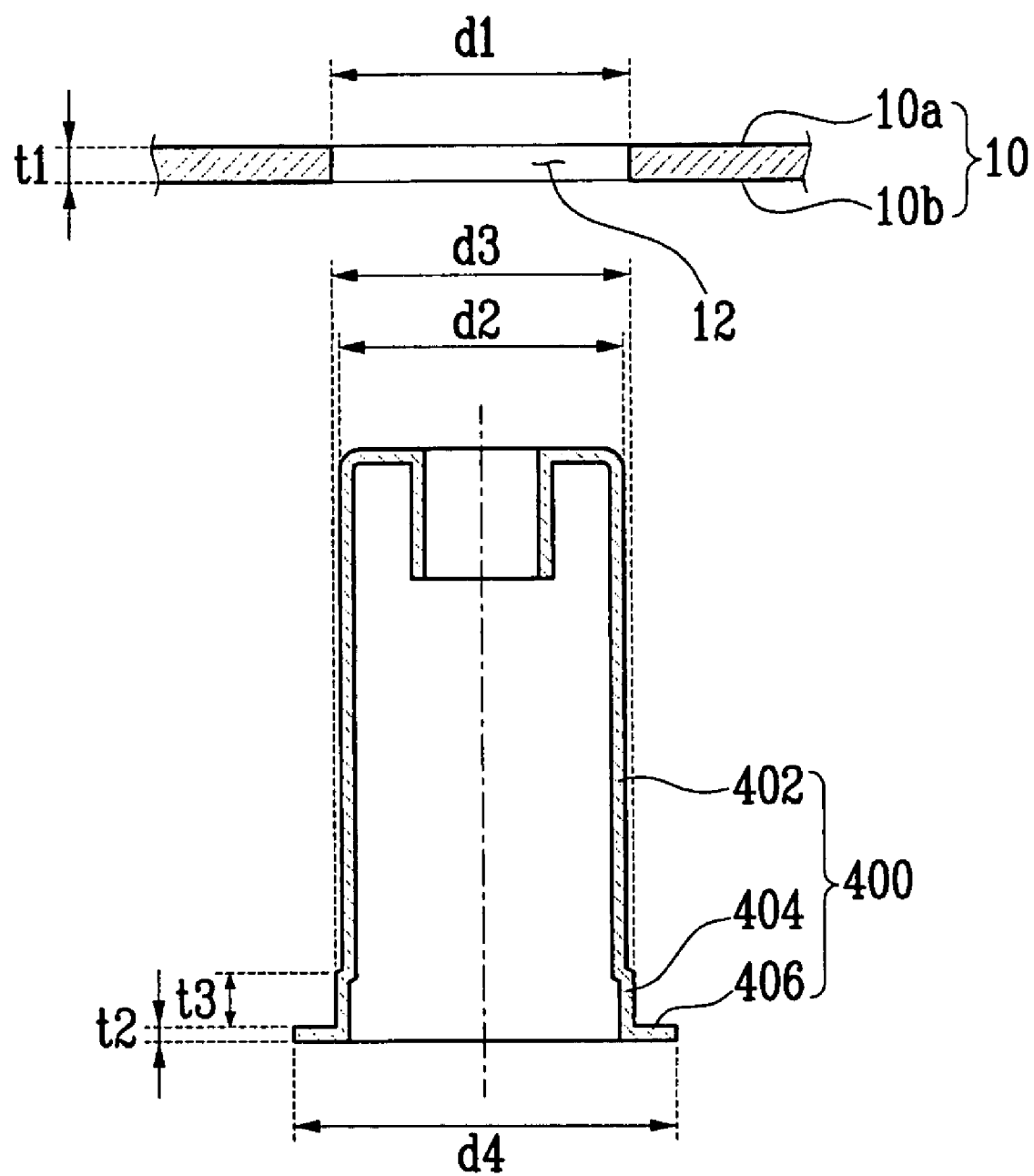
FIG. 6 is a sectional view of a coupling structure between one standoff and a chassis base according to another embodiment of the present invention.

FIG. 6 is a sectional view of a coupling structure between one standoff and a chassis base according to another embodiment of the present invention.

As shown in FIG. 6, a standoff 400 according to another embodiment is designed to be attached with the press-in process described in the foregoing embodiment. The standoff 400 is formed of a thin plate through a pressing process. In this case, the cost can be further reduced as compared to a case in which the standoff 400 is formed through a forging process.

The standoff 400 of the present embodiment includes a cylindrical portion 402, a first deforming portion 404, and a second deforming portion 406. That is, a basic structure of the standoff 400 of the present embodiment is similar to that of the foregoing embodiment of FIG. 3. In this embodiment, the standoff 400 is formed of the thin plate through the pressing process.

The standoff 400 has a first end inserted in the assembly hole 12 of the chassis base 10 and a second end forcedly pressed in the chassis base 10 by an external force.

The cylindrical portion 402 has an outer diameter d2 less than a diameter d1 of the assembly hole 12 so that it can be inserted in the assembly hole 12.

The first deforming portion 404 extends integrally from the cylindrical portion 402. The first deforming portion 404 contacts an inner circumference of the assembly hole 12 when the standoff 400 is inserted in the assembly hole 12. The first deforming portion 404 has an outer diameter d3 greater than the outer diameter d2 of the cylindrical portion 402 but less than the diameter d1 of the assembly hole 12.

The first deforming portion 404 is forcedly pressed in a first surface 10a of the chassis base 10 according to an external force in a state where the first deforming portion 404 is inserted in the assembly hole 12.

The second deforming portion 406 is integrally formed with the first deforming portion 404, having an outer diameter d4 greater than the diameter d1 of the assembly hole 12. As the outer diameter d4 of the second deforming portion 406 is greater than the diameter d1 of the assembly hole 12, the second deforming portion 406 is not inserted into the assembly hole 12 but contacts a second surface 10b of the chassis base 10. The second deforming portion 406 is forcedly pressed in the second surface 10b of the chassis base 10 according to an external force in a state where it contacts the second surface 10b of the chassis base 10.

Figure 7:
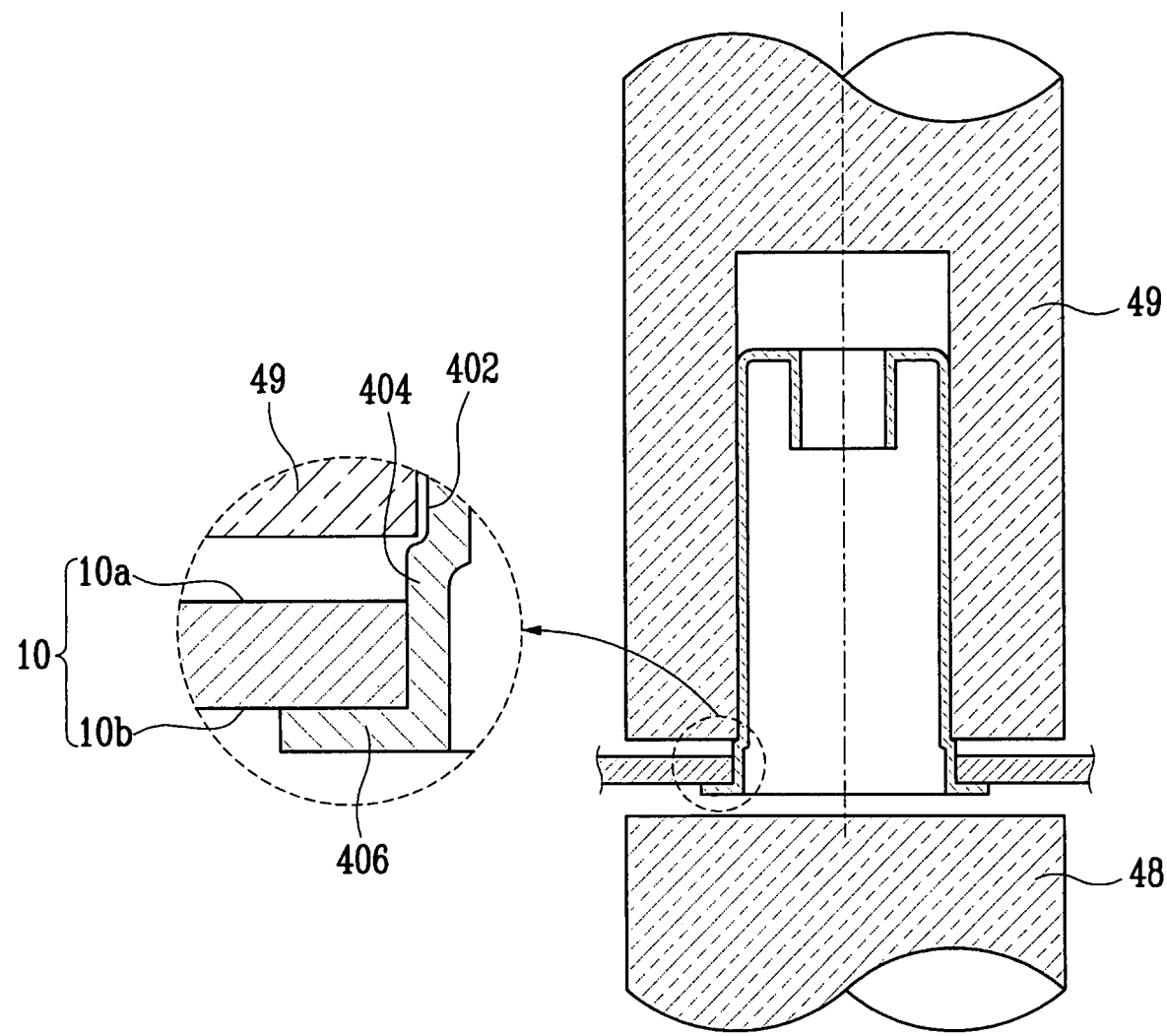
FIG. 7 is a sectional view of an example where a mold is used when a standoff is coupled to a chassis base according to another embodiment of the present invention.
Figure 8:
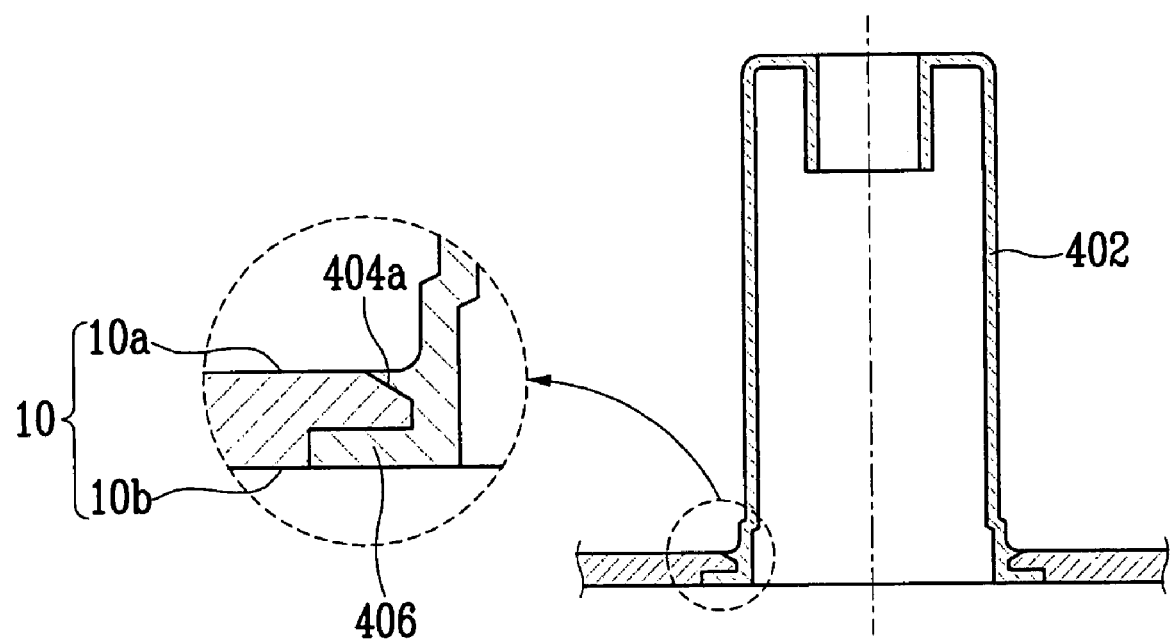
FIG. 8 is an exploded perspective view of a coupled state between the standoff and the chassis base according to another embodiment of the present invention.

FIG. 7 is a sectional view of an example where a mold is used when the standoff is coupled to the chassis base according to another embodiment of the present invention and FIG. 8 is an exploded perspective view of a coupled state between the standoff and the chassis base according to another embodiment of the present invention.

As shown in FIG. 7, the cylindrical portion 402 and the first deforming portion 404 of the standoff 400 are first inserted into the assembly hole 12 of the chassis base 10 so that the second deforming portion 406 surface-contacts the chassis base 10. Therefore, the standoff 400 is primarily coupled to the chassis base 10.

Then, as shown in FIG. 7, a mold having a punch 48 and a die 49 is used to press-deform the first deforming portion 404 inserted in the assembly hole 12 of the chassis base 10 and the second deforming portion 406 contacting the second surface 10b of the chassis base 10.

At this point, as shown in FIG. 8, the pressed portion of the first deforming portion 404 is pressed in the first surface 10a of the chassis base 10 adjacent to an upper portion of the assembly hole 12, thereby forming an inclined surface 404a. In addition, the pressed portion of the second deforming portion 406 is pressed in the second surface 10b of the chassis base 10 adjacent to a lower portion of the assembly hole 12.

As described above, the first and second deforming portions 44 and 46 are respectively pressed in the first and second surfaces 10a and 10b of the chassis base 10 at the upper and lower portions of the assembly holes 12, thereby enhancing the coupling force to the chassis base 10 and enduring a relatively high load.

Furthermore, as shown in FIG. 8, when the first and second deforming portions 404 and 406 are pressed in the chassis base 10, the surfaces of the standoff 400 is disposed on a common plane with the surfaces of the chassis base 10 and thus a contact resistance caused by a protruding portion of the standoff 400 can be prevented during an assembling process of the chassis base 10 with the PDP 20.

As described above, since the standoff 400 of the present embodiment is formed of the thin plate through the pressing process and the coupling of the standoff 400 with the chassis base 10 is realized through a press-in process using the mold, the cost can be further reduced as compared to the forging process.

According to the present invention, since the standoff is coupled to the chassis base by pressing the first and second deforming portions in the chassis base in a state where the standoff is inserted in the chassis base, the coupling force of the standoff to the chassis base can be further improved and endurance against a high load can be enhanced.

In addition, even when the chassis base is thinner than a preset value, there is no need to process a groove for the standoff on the chassis base and thus the deterioration of the drawing force can be prevented. Furthermore, since there is no need to additionally process the standoff, productivity can be improved.

Furthermore, when the standoff is pressed in the chassis base, the standoff is disposed on a common plate with the chassis base and thus the contact resistance caused by a protruding portion of the standoff can be prevented when the PDP is attached to the chassis base.

Although exemplary embodiments of the present invention have been described in detail hereinabove, it should be clearly understood that many variations and/or modifications of the basic inventive concept taught herein still fall within the spirit and scope of the present invention, as defined by the appended claims.

What is claimed is:

1. A plasma display device comprising:
a chassis base to support a Plasma Display Panel (PDP) and including at least one assembly hole; and
at least one standoff coupled to a corresponding assembly hole of the chassis base, with each standoff having a first end and an axially opposite second end, with the standoff comprising:
an elongate portion formed closer to the first end than the second end;
a second deforming portion formed on the second end; and
a first deforming portion formed between the elongate portion and the second deforming portion, with the first deforming portion and the second deforming portion being embedded inside the chassis base.

2. The plasma display device of claim 1, wherein:
the first deforming portion being pressed in a first direction from the first end of the standoff to the second end of the standoff to be embedded into the chassis base through a first major surface of the chassis base; and
the second deforming portion being pressed in a second direction from the second end of the standoff to the first end of the standoff to be embedded into the chassis base though a second major surface opposite to the first major surface of the chassis base.

3. The plasma display device of claim 2, wherein the first deforming portion has a greater outer diameter than an outer diameter of the elongate portion.

4. The plasma display device of claim 3, wherein the first deforming portion has a height greater than a thickness of the chassis base.

5. The plasma display device of claim 3, wherein the second deforming portion has a greater outer diameter than a diameter of the corresponding assembly hole.

6. The plasma display device of claim 5, wherein the second deforming portion has a thickness less than that of the chassis base.

7. The plasma display device of claim 2, wherein a surface of the first deforming portion that is closer to the elongate portion than the second deforming portion is arranged on a common plane with the first major surface of the chassis base upon the first deforming portion being pressed into the chassis base through the first surface of the chassis base.

8. The plasma display device of claim 7, wherein the first deforming portion being deformed such that a plane where a pressed surface of the first deforming portion contacts the chassis base is inclined with respect to the first surface of the chassis base upon the first deforming portion being pressed into the chassis base through the first surface of the chassis base.

9. The plasma display device of claim 2, wherein a surface of the second deforming portion is arranged on a common plane with the second surface of the chassis base upon the second deforming portion being pressed into the chassis base through the second surface of the chassis base.

10. The plasma display device of claim 2, wherein the elongate portion includes a coupling hole to receive a coupling member.

11. The plasma display device of claim 10, wherein the coupling hole includes a screw thread arranged on an inner wall of the elongate portion.

12. A method of manufacturing a plasma display device, the method comprising:
fabricating at least one assembly hole in a chassis base to support a Plasma Display Panel (PDP);
fabricating at least one standoff having a first end and an axially opposite second end, with the standoff comprising:
an elongate portion formed closer to the first end than the second end;
a second deforming portion formed on the second end; and
a first deforming portion formed between the elongate portion and the second deforming portion; and
pressing at least one standoff into a corresponding assembly hole in the chassis base by pressing the first deforming portion and the second deforming portion into the chassis base to embed the first deforming portion and the second deforming portion inside the chassis base.

13. The method of claim 12, wherein the method further comprises:
inserting the elongate portion having an outer diameter into a corresponding assembly hole;
inserting the first deforming portion into the corresponding assembly hole and pressing the first deforming portion in a first direction from the first end of the standoff to the second end of the standoff to embed the first deforming portion into the chassis base through a first major surface of the chassis base; and
pressing the second deforming portion in a second direction from the second end of the standoff to the first end of the standoff to embed the second deforming portion into the chassis base through a second major surface opposite to the first major surface of the chassis base.

14. The method of claim 13, wherein the first deforming portion is fabricated to have a greater outer diameter than an outer diameter of the elongate portion.

15. The method of claim 14, wherein the first deforming portion is fabricated to have a height greater than a thickness of the chassis base.

16. The method of claim 14, wherein the second deforming portion is fabricated to have a greater outer diameter than a diameter of the corresponding assembly hole.

17. The method of claim 16, wherein the second deforming portion is a fabricated to have a thickness less than that of the chassis base.

18. The method of claim 13, wherein a surface of the first deforming portion is arranged on a common plane with the first surface of the chassis base upon the first deforming portion being pressed into the chassis base through the first surface of the chassis base.

19. The method of claim 18, wherein a plane where a pressed surface of the first deforming portion contacts the chassis base is inclined with respect to the first surface of the chassis base upon the first deforming portion being pressed into the chassis base through the first surface of the chassis base.

20. The method of claim 13, wherein a surface of the second deforming portion is arranged on a common plane with the second surface of the chassis base upon the second deforming portion being pressed into the chassis base through the second surface of the chassis base.

21. A plasma display device comprising:
a chassis base to support a Plasma Display Panel (PDP) and including an assembly hole; and
a standoff coupled to the assembly hole of the chassis base, with each standoff having a first end arranged in a corresponding assembly hole of the chassis base and a second end coupled to the chassis base, and the standoff comprising:
an elongate portion formed closer to the first end than the second end;
a second deforming portion formed on the second end; and
a first deforming portion formed between the elongate portion and the second deforming portion, with the first deforming portion and the second deforming portion being pressed toward each other to be deformed and to clamp the chassis base in between the first deforming portion and the second deforming portion, and the first deforming portion and the second deforming portion being embedded inside the chassis base.

* * * * *